United States Patent
Gnann et al.

(10) Patent No.: US 10,349,643 B2
(45) Date of Patent: Jul. 16, 2019

(54) ELASTICALLY SUPPORTED WEAR RESISTANT LINE GUIDE AND METHOD OF MANUFACTURE

(71) Applicant: EdgeWater International, Inc., Stafford Springs, CT (US)

(72) Inventors: Alan J. Gnann, Tolland, CT (US); Alan J. Bednaz, Terryville, CT (US); James Gustavson, Plantsville, CT (US); Michael R. Spring, Unionville, CT (US); Keegan Setaro, Enfield, CT (US)

(73) Assignee: EdgeWater International, Inc., Stafford Springs, CT (US)

( * ) Notice: Subject to any disclaimer, the term of this patent is extended or adjusted under 35 U.S.C. 154(b) by 250 days.

(21) Appl. No.: 15/084,658

(22) Filed: Mar. 30, 2016

(65) Prior Publication Data
US 2016/0286772 A1    Oct. 6, 2016

Related U.S. Application Data

(60) Provisional application No. 62/139,840, filed on Mar. 30, 2015.

(51) Int. Cl.
*A01K 87/04* (2006.01)
(52) U.S. Cl.
CPC .................. *A01K 87/04* (2013.01)
(58) Field of Classification Search
CPC ..................................................... A01K 87/04
(Continued)

(56) References Cited

U.S. PATENT DOCUMENTS 2,306,112 A * 12/1942 Touchstone ............ A01K 87/04
43/24
2,561,675 A    7/1951 Ross
(Continued)

FOREIGN PATENT DOCUMENTS

GB    2082032 A * 3/1982 ............ A01K 87/04
JP    5113690 A    2/1976
(Continued)

OTHER PUBLICATIONS

English-language translation of JP 2011-229490 (Year: 2011).*
International Search Report and Written Opinion dated May 27, 2016 (PCT/US2016/024837).

*Primary Examiner* — Lisa L Tsang
(74) *Attorney, Agent, or Firm* — Alix, Yale & Ristas, LLP

(57) ABSTRACT

The disclosed line guides combine a wear resistant ring with a superelastic, shape memory alloy frame and support to provide a lightweight and durable assembly. The wear resistant ring is constructed of hard material such as ceramic. The wear resistant ring includes a groove or annular depression on the outside surface where the ring and frame meet. The elastic frame is configured to grip the ring, which provides an enhanced mechanical connection between the wear resistant ring and the superelastic frame. The groove also provides a location for the application of adhesive. The frame is exposed around the wear resistant ring and protects the ring from damage during storage, transportation and use. The superelastic alloy frame and support flex to absorb shock and when deformed rebound to their original shape.

17 Claims, 9 Drawing Sheets

(58) Field of Classification Search
USPC .................................................... 43/24
See application file for complete search history.

(56) References Cited

U.S. PATENT DOCUMENTS

| | | | |
|---|---|---|---|
| 3,099,889 A | 8/1963 | Verneuil | |
| 4,011,680 A * | 3/1977 | Rienzo, Sr. | A01K 87/04 43/24 |
| 4,030,224 A | 6/1977 | Dorph | |
| 4,141,132 A | 2/1979 | Ohmura | |
| 4,156,319 A * | 5/1979 | Wood | A01K 87/04 43/24 |
| 4,174,583 A | 11/1979 | Ohmura | |
| 4,196,537 A | 4/1980 | Ohmura | |
| 4,287,678 A | 9/1981 | Yamamoto | |
| 4,428,140 A * | 1/1984 | Yamamoto | A01K 87/04 43/24 |
| 4,616,438 A | 10/1986 | Ohmura | |
| 5,177,892 A * | 1/1993 | Ohmura | A01K 87/04 43/24 |
| 6,067,742 A | 5/2000 | Ohmura | |
| 6,067,743 A | 5/2000 | Ohmura | |
| 6,088,947 A * | 7/2000 | Suzue | A01K 87/00 280/819 |
| 6,283,163 B1 * | 9/2001 | Kagi | D03C 9/024 139/93 |
| 6,612,065 B1 * | 9/2003 | Blanchette | A01K 87/00 43/24 |
| 8,333,030 B2 | 12/2012 | Jeong | |
| 8,365,458 B2 | 2/2013 | Omura | |
| 2004/0047070 A1 | 3/2004 | Shiga | |
| 2006/0278684 A1 | 12/2006 | Ohtsuki et al. | |
| 2011/0239519 A1 * | 10/2011 | Akiba | A01K 87/04 43/24 |
| 2017/0118967 A1 * | 5/2017 | Omura | A01K 87/04 |

FOREIGN PATENT DOCUMENTS

| | | | |
|---|---|---|---|
| JP | 11346110 A | | 12/1999 |
| JP | 2001178321 A | | 7/2001 |
| JP | 2008054901 A | | 3/2008 |
| JP | 2011229490 A | * | 11/2011 |
| JP | 2012075375 A | | 4/2012 |
| JP | 2012110287 A | | 6/2012 |
| WO | 9960847 A1 | | 12/1999 |

* cited by examiner

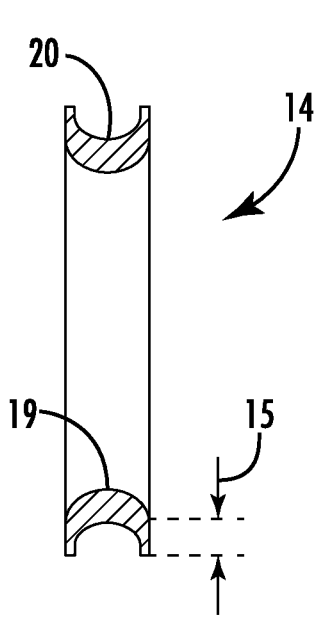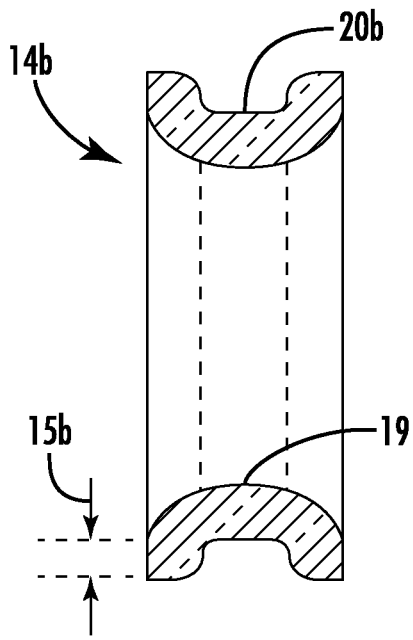
FIG. 6    FIG. 6A
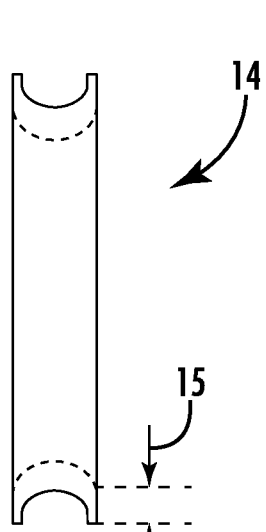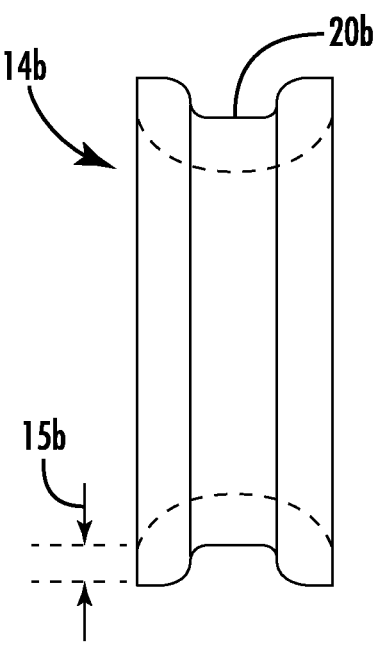
FIG. 7    FIG. 7A

ELASTICALLY SUPPORTED WEAR RESISTANT LINE GUIDE AND METHOD OF MANUFACTURE

BACKGROUND

The present disclosure relates to an improved line guide assembly for fishing rods.

Line guides are employed to control movement of fishing line along the length of a fishing rod during use. Over the lifetime of the fishing rod, fishing line is cast and retrieved through the guides thousands of times, bringing with it moisture and particles from the environment. This repeated movement of the fishing line through the guides commonly results in abrasive wear on the inside circumference of the guides. It is common to employ rings of very hard material such as ceramic to define the inside circumference of the guides to improve resistance to wear. The extreme hardness of the wear resistant ceramic rings complicates manufacture of the rings and assembly of the rings to a support that positions the guide above the surface of the rod. The ceramic rings also tend to be very brittle, so the use of lightweight or complex sectional shapes is not practical. It is common for the rings to be secured to the support by an adhesive, which fails upon repeated flexure and causes the rings to pop out. The frame that supported the wear resistant ring is typically left with exposed edges and remnants of the adhesive that tend to cut fishing line, making the rod unfit for use until the damaged guide is replaced, Typically, each rod carries five to fifteen such guides as well as a tubular top member and hook keeper. These components vary in size and weight to accommodate the intended use of the fishing rod. Fishing enthusiasts generally prefer components of smaller size or gauge and of reduced weight. Unfortunately, lighter gauge material also is more susceptible to distortion, bending and breaking unless the rod is carefully handled. For example, when packing or transporting the rod it is possible to bend the fishing line guides inadvertently or accidentally, requiring that the guides be straightened, typically by cold working which tends to increase the brittleness of the material and therefore reduces the usable life of the guide component. In many cases the distortion of the conventional guides and tops is caused by the rod getting caught on branches and trees when walking through the woods and brush.

U.S. Pat. No. 6,612,065 describes line guides manufactured from super-elastic shape memory alloy material. Such line guides are extremely durable and resistant to deformation due to the superelastic properties of the Nickel Titanium (NiTi) alloy materials. These line guides have gained significant acceptance among fishermen.

SUMMARY

The disclosed line guides combine a wear resistant ring with a superelastic, shape memory alloy frame and support to provide a lightweight and durable assembly. The wear resistant ring is constructed of hard material such as ceramic. Silicon Carbide (SiC), Zirconia ($ZrO_2$), Silicon Nitride ($Si_3N_4$), and Alumina ($_3 Al_2O_3$) are ceramic materials compatible with the disclosed line guides. Other hard and wear resistant materials may also be suitable. According to aspects of the disclosure, the wear resistant ring includes a groove or annular depression on the outside surface where the ring and frame meet. The groove provides an enhanced mechanical connection between the wear resistant ring and the superelastic frame. The groove also provides a location for the application of adhesive, where the enhanced surface area of contact between the ring and frame at the location of the groove improves the resulting adhesive bond between the wear resistant ring and the frame.

In the disclosed line guide assembly, the frame and support are constructed of shape memory alloy material that is heat treated and mechanically worked to have superelastic properties over a temperature range consistent with the environment for most fishing activities, e.g., approximately 0° C. (32° F.)-38° C. (100° F.). Chilling the superelastic material significantly below the bottom of this range will convert the material into a pliable martensitic phase that allows significant deformation without permanent change in shape. Superelasticity refers to the ability of properly prepared shape memory alloys to recover from strains of up to 8% that would permanently deform ordinary elastic metals such as stainless steel. Over the temperature range of normal use, the superelastic frame is in an austenitic state, which is relatively stiff. When exposed to high levels of stress, the superelastic material undergoes a temporary phase transformation into a stress induced martensitic condition that permits elastic deformation (strain) of the material without permanent deformation. When the stress is removed, the material reverts to its pre-stress austenitic condition. This property of the disclosed frame and support enhance the durability of the disclosed line guide assemblies when exposed to impact and bending stresses.

The superelastic properties of the shape memory alloy material used for the frame and support of the disclosed line guide assemblies enhance the mechanical connection between the frame and wear resistant ring by elastically gripping the ring. The superelastic shape memory alloy support and attachment portions of the line guide assembly recover their original shape after strains of up to 8% that would distort conventional elastic metals such as stainless steel. These alloys also have the so-called "shape memory" attribute, where chilling the material below its transformation temperature renders the material soft and pliable. In the soft, pliable martensitic phase, shape memory alloy material can be distorted, for example to replace a damaged wear resistant ring without the need to remove the frame from the rod blank. When the shape memory alloy warms through its transformation temperature, it recovers its programmed shape while reverting to a relatively stiff austenitic phase. NiTi alloys are also resistant to tarnish and do not rust or oxidize when exposed to saltwater, naturally have a low coefficient of friction and are less dense than conventional stainless steel.

If the wear resistant ring becomes separated from the frame, or is worn, damaged or cracked, the frame and support can be chilled to a martensitic (pliable) state and the ring can be reinserted. When the frame and support warm to ambient temperatures, they will return to an austenitic state and again grip and support the retained wear resistant ring. If the wear resistant ring is lost or broken, the smooth, round shape of the wire frame allows the line guide to be used without the ring, with little risk of abrasion or damage to the fishing line.

Aspects of the frame and ring relationship combine to form a robust mechanical connection between the frame and the wear resistant ring. One is the relationship between the groove in the wear resistant ring and the diameter of the wire from which the frame is constructed. The outside diameter of the ring defines an upper edge of the annular groove and is larger than the inside diameter of the frame, resulting in an overlap that retains the ring relative to the frame. The depth of the groove may be as little as 25% of the diameter of the wire or as great as 95% of the diameter of the wire. Generally speaking, a deeper groove provides greater mechanical connection between the ring and the frame. The other is the relationship between the frame and the circumference of the wear resistant ring. The frame may be configured to surround as little as 50% (180°) of the circumference of the ring, or up to approximately 90% (325°) or more of the circumference of the wear resistant ring. Generally speaking, a greater percentage of the circumference of the ring surrounded by the frame, the greater the mechanical engagement between the frame and the ring. The frame is configured to grip the ring at the frame/groove interface. In combination, the groove partially surrounding the frame, along with the frame tightly surrounding a majority of the ring provide a robust mechanical connection between the frame and the ring, even in the absence of adhesive. Adhesive may be added to enhance the security of the engagement between the frame and the ring.

BRIEF DESCRIPTION OF THE DRAWINGS

FIG. 6 is a sectional view of the wear resistant ring of the line guide assembly of FIG. 1;

FIG. 6A is a sectional view through an alternative embodiment of a wear resistant ring according to aspects of the disclosure;

FIG. 7 is a side view of the wear resistant ring of FIG. 6;

FIG. 7A is a side view of the wear resistant ring of FIG. 6A;

DETAILED DESCRIPTION OF THE DISCLOSED EMBODIMENTS

Figure 3:
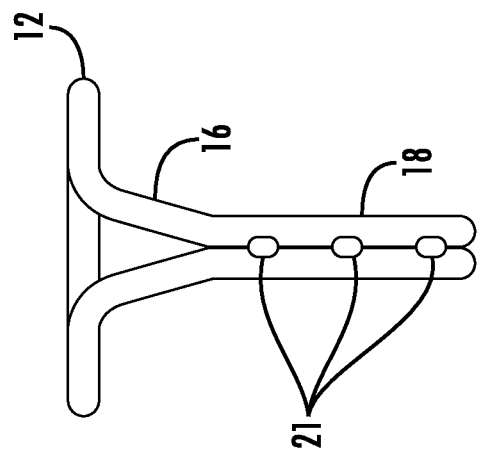
FIG. 3 is a bottom plan view of the frame, support and attachment of the line guide assembly of FIG. 1 without the wear resistant ring.

Line guide assemblies according to the disclosure are illustrated in FIGS. 1-17. A first embodiment of a line guide assembly 10 is illustrated in FIGS. 1-8. Line guide assembly 10 includes a wire frame 12 surrounding a wear resistant ring 14. The frame 12 is part of a wireform including support ring 16 and attachment 18 that situate the wear resistant ring 14 above a fishing rod blank 30 shown in FIGS. 4, 5. The wear resistant ring 14 defines a circumferential groove 20 that receives the frame 12 to mechanically connect the wear resistant ring 14 to the frame 12. The support portion 16 of the line guide assembly 10 may also be referred to as "legs", while the attachment portion 18 may be referred to as a "foot." The attachment portion 18 is typically secured to the rod blank 30 by wrapping thread and adhesive (not shown) so the wear resistant rings of a series of line guide assemblies define a path for fishing line along the length of a fishing rod.

It is typical for the diameter of each line guide in a series to increase as the series progresses from the tip of a fishing rod toward the butt and reel. Therefore, generally each line guide assembly in a series has a slightly different configuration, with line guide assemblies near the reel having a larger diameter and typically being spaced further from the rod blank (not shown). The proportions of the line guide assemblies change accordingly, so the diameter of the wire used for a line guide assembly near the reel is larger and supports a larger diameter wear resistant ring further from the rod blank than a line guide near the rod tip. Changes in proportion and wire diameter may necessitate adjustments to the length of the legs of the support portion 16, the angular position of the support portion 16 and frame 12 relative to the foot of the attachment portion 18 of the wireform, as well as changes in the length of the attachment portion along the rod blank. The length of the attachment portion 18 along the rod blank is also typically greater in the larger diameter line guides closer to the reel end of the fishing rod.

In the disclosed embodiments, the wireform used to construct the frame 12, support portion 16 and attachment portion 18 is a single, continuous length of Nickel Titanium (NiTi) shape memory alloy wire with a round cross-section. Other superelastic, shape memory materials may be compatible with the disclosed embodiments, and wire having cross sectional shapes other than round may also function in the context of the disclosed embodiments. The wire is placed on a form and heat treated so that at least the frame 12 and support portion 16 have superelastic properties over a range of temperatures encountered in most fishing environments, e.g., a range of about 32° F. (0° C.)-100° F. (38° C.). This process also imparts the finished shape of the frame 12, support portion 16, and attachment portion 18, to which the part will return when distorted in the chilled, martensitic state. The superelastic properties of shape memory alloy wire makes the disclosed assemblies extremely durable and resistant to bending forces and impacts on the assemblies. The superelastic wireframes will rebound to their original shape from strains that would permanently deform other materials, such as stainless steel. The NiTi alloy is highly resistant to corrosion from salt and materials commonly encountered in fishing environments. The highly flexible superelastic NiTi wireforms move with the rod blank during casting and use, resulting in livelier rod action and less damping of rod flexure than occurs with less flexible line guide assemblies.

A shape-memory alloy (SMA) is an alloy that "remembers" its original shape and that when deformed in its cold martensitic state returns to its original shape when heated through its transformation temperature. The two main types of shape-memory alloys are copper-aluminium-nickel, and nickel-titanium (NiTi) but SMAS can also be created by alloying zinc, copper, gold and iron. Iron-based and copper-based SMAS, such as Fe—Mn—Si, Cu—Zn—Al and Cu—Al—Ni, are commercially available and cheaper than NiTi. However, NiTi based SMAs are more preferable for most applications due to their stability, practicability and superior thermo-mechanic performance.

SMAs under certain conditions display the property of superelasticity, which allows the material to recover from unusually large strains. Instead of transforming between the martensite and austenite phases in response to temperature, this phase transformation can be induced in response to mechanical stress. When SMAs are loaded in the austenite phase, the material will transform to the martensite phase above a critical stress, proportional to the transformation temperatures. Upon continued loading, the twinned martensite will begin to de-twin, allowing the material to undergo large deformations. Once the stress is released, the martensite transforms back to austenite, and the material recovers its original shape. As a result, these materials can reversibly deform from very high strains of up to 8 percent.

The wireframes are configured so the frame 12 defines an inside diameter smaller than the outside diameter of the wear resistant ring 14, so the frame 12 is at least partially received in the groove 20 defined by the ring 14. The inside diameter of the frame 12 is also slightly smaller than the smallest diameter defined inside the groove 20, so the frame 12 elastically grips the ring 14. The wireframe is placed around the ring 14 and may be secured in place using appropriate adhesive. The groove 20 is intentionally slightly larger in width than necessary to accommodate the diameter of the wire in the frame 12, leaving some room for adhesive. The groove/frame interface in the disclosed line guide assemblies 10 increases the surface area of contact between the frame 12 and ring 14, enhancing the adhesive bond.

Figure 2:
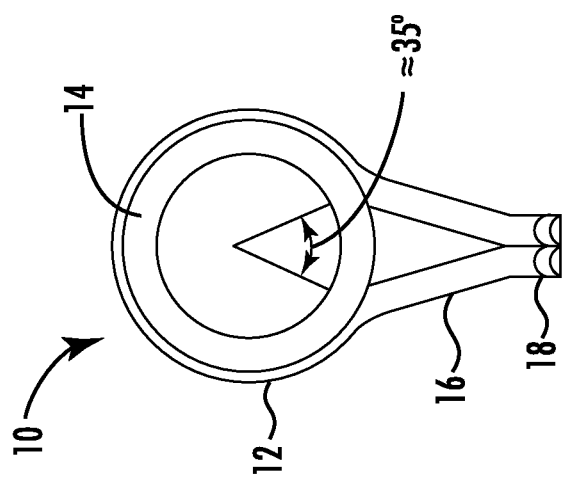
FIG. 2 is a front plan view of the line guide assembly of FIG. 1.
Figure 5:
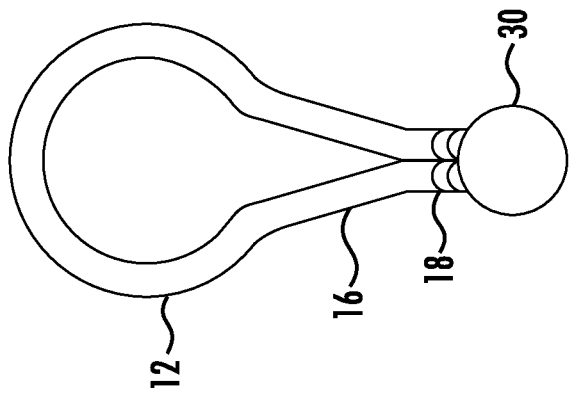
FIG. 5 is a front plan view of the frame, support and attachment of FIG. 3.

As shown in FIGS. 2 and 3, the attachment portion 18 or "foot" is formed from parallel segments of the wire that may be welded or otherwise secured to each other. According to one assembly sequence, the wear resistant ring 14 is installed in the frame 12, with the frame received in the groove 20 defined by the wear resistant ring 14 and then the legs 16 of the frame 12 are brought together and the lower segments that form the attachment portion 18 secured to each other by welds, adhesive, or other means. When the attachment portion 18 is secured to a rod blank 30 as shown in FIG. 5, the winding material and adhesive will further hold the segments together.

Figure 1:
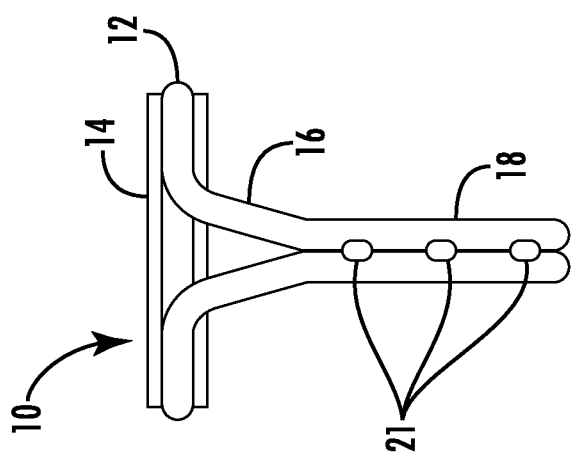
FIG. 1 is a bottom plan view of a first embodiment of a line guide assembly according to aspects of the disclosure.

It will be noted that the frame 12 surrounds approximately 90% of the circumference of the wear resistant ring 14, and is configured to allow the frame 12 to flex radially relative to the ring 14. In the embodiment of FIGS. 1-8, the frame 12 surrounds about 325°, or about 90% of the circumference of the wear resistant ring 14, Leaving approximately 35° of the ring not surrounded by the frame 12. The groove 20 in the wear resistant ring 14 has a depth greater than about ½ the diameter of the wire from which the frame 12 is constructed. As shown in FIGS. 1 and 2, the illustrated groove depth/wire diameter ratio results in a majority of the frame 12 being received in the groove 20, leaving some of the frame 12 extending above the groove 20. The portion of the frame projecting beyond the groove serves to protect the relatively brittle wear resistant ring from impacts during storage, transportation and use. The wire forming the frame 12 is substantially more impact resistant and flexible than the wear resistant ring 14 and affords significant protection for the ring by absorbing impacts by flexure of the frame 12 and support portion 16.

Table 1 below illustrates the relationship of wire diameter to groove depth 15 for a representative set of 6 line guides from size RC-6 (smallest diameter) to size RC-25 (largest diameter). The representative set of 6 line guides are selected from among approximately 10 sizes and are used to illustrate typical manufacturing variation and the resulting relationships between the frame 12 and the wear resistant ring 14. The groove depth 15 is sufficient to receive a majority of the wire diameter of the frame 12, leaving a small portion of the wire projecting beyond the groove 20. The portion of the frame 12 projecting radially outward of the groove 20 serves to protect the relatively fragile wear resistant ring 14 from damage by impact during transport, storage or use.

TABLE 1

| Size | Wire Size | Groove Depth | Amount of wire outside of Groove | Percentage of Wire Held Within Groove |
| --- | --- | --- | --- | --- |
| RC-6 | .022 | .019 | .003 | 84 |
| RC-8 | .030 | .021 | .009 | 71 |
| RC-10 | .037 | .026 | .011 | 69 |
| RC-12 | .037 | .029 | .008 | 79 |
| RC-16 | .045 | .039 | .006 | 87 |
| RC-25 | .060 | .054 | .006 | 89 |

Table 2 below illustrates the relationship between the circumference of the wear resistant ring 14 and the frame 12 for the representative set of line guides shown in Table 1. The frames are configured to surround approximately 90% of the circumference of the wear resistant ring 14, or about 325°. The set of line guides shown in Tables 1 and 2 are designed together from consistent materials and methods of manufacture, so the variation between line guides in the set is relatively minor. Line guides employing alternative materials and manufacturing methods may exhibit a greater variation from the disclosed relationships.

TABLE 2

| Size | Degree of Encapsulation | Percentage of Encapsulation |
| --- | --- | --- |
| RC-6 | 325 | 90 |
| RC-8 | 320 | 89 |
| RC-10 | 325 | 90 |
| RC-12 | 320 | 89 |
| RC-16 | 320 | 89 |
| RC-25 | 325 | 90 |

The disclosed frame configurations can be described as "open" in contrast to frames that include a closed circle of material completely surrounding the wear resistant ring. The disclosed frame configurations allow the frame 12 to grip the wear resistant ring 14 and bend relative to the ring 14 during use. The disclosed line guide assemblies combine a lightweight, tough and highly flexible shape memory alloy frame 12, support 16 and attachment 18 with a grooved wear resistant ring 14.

After the frame 12 is secured around the ring 14, the legs of the support portion 16 may be secured together to form the foot of the attachment portion 18. The legs may be welded or adhesively bonded as shown in the disclosed embodiments (see FIGS. 1, 3, and 10 at ref. #21). The wireform is ground and/or swaged as shown in FIGS. 2, 4, 5, 9 and 10 to define a mounting surface on the bottom of the attachment portion complementary to the outside surface of the rod blank. When the disclosed line guides 10 are secured to the rod blank 30 with wrapping thread and adhesive (not shown), the wear resistant ring 14 is supported in a predetermined position relative to the blank.

Figure 4:
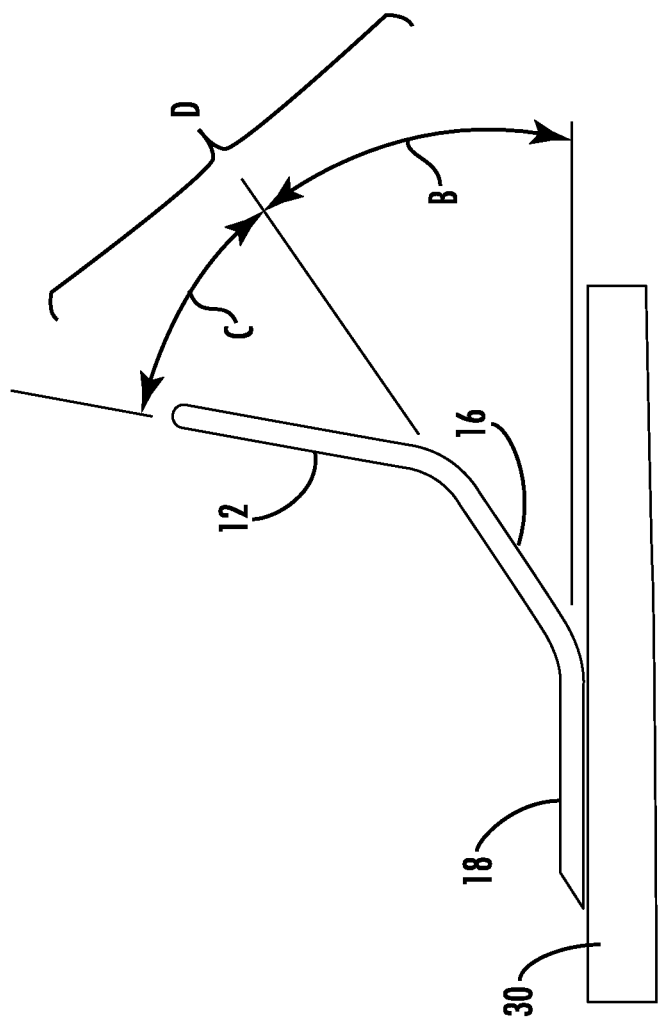
FIG. 4 is a side view of the frame, support and attachment of FIG. 3.

With reference to FIG. 4, the legs of the support portion 16 are arranged at an acute angle B relative to the attachment portion 18 and the frame 12 is arranged at an acute angle C relative to the support portion 16 when measured relative to the rod blank 30 as shown in FIGS. 4, 5. As a result, the frame 12 is supported at an acute angle D relative to the attachment portion 18 which is aligned with the longitudinal axis of the rod blank 30. It is common for fishing line to get looped around one or more line guides when the line is allowed to go slack, and this may require the person using the rod to manually untangle the line from around the line guides. The disclosed configuration of a line guide 10 having an attachment portion 16 and frame 12 angled toward the tip of the rod may assist fishing line to slip over the outside of the frame 12 without manual intervention by the person using the rod.

A second embodiment of a line guide assembly 10a, according to aspects of the disclosure is illustrated in FIGS. 9-12. The second embodiment illustrates a line guide assembly 10a compatible with a position closer to the rod tip than the first embodiment 10 of FIGS. 1-8. The legs of the support portion 16a are shorter, positioning the ring 14a closer to the rod blank (not shown). The wear resistant ring 14a of the second embodiment has a smaller diameter and generally reduced sectional dimensions relative to ring 14 of the first embodiment. It will be observed that the groove 20a defined by ring 14a is shallower relative to the diameter of the wire of the frame 12a than the corresponding groove 20 and wire of the frame 12 in the first embodiment 10. Groove 20a has a depth less than about 25% of the diameter of the wire of the frame 12, so a majority of the wire projects above the groove 20a. One reason is that the smaller ring 14a lacks the sectional dimensions necessary to accommodate a deeper groove; such a deep groove may render the smaller ring 14a too fragile. The smaller ring 14a also has rounded outside corners in comparison to the squared corners of the ring 14 of the first embodiment. The differences between line guide assemblies 10 and 10a are typical of the differences between line guide assemblies in a series where the diameter of the wear resistant rings 14, diameter of the wire of the wireframes and position of the ring 14 relative to the rod blank change as the line guide series progresses along the blank.

Figure 9:
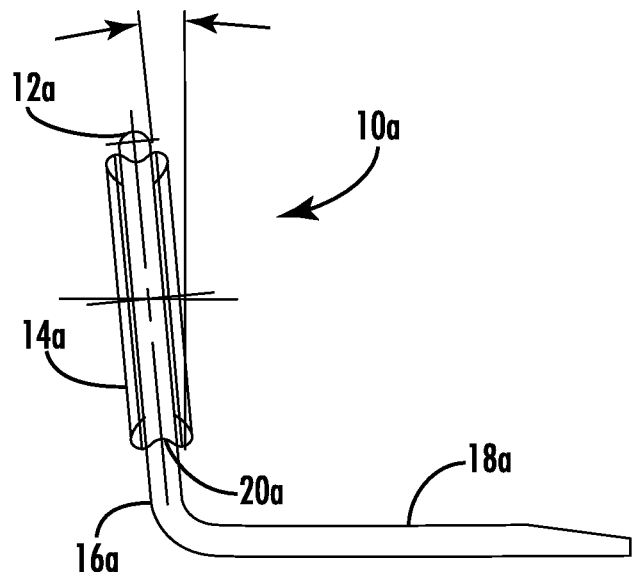
FIG. 9 is a side view, partially in section, of a second embodiment of a line guide assembly according to aspects of the disclosure.

The frame 12a of embodiment 10a surrounds approximately 270° of the circumference of the ring 14a, or about 75% of the circumference of the ring. In this embodiment, approximately 90° of the circumference of the wear resistant ring is not surrounded by the frame 12a. As shown in FIG. 9, the guide 10a supports the frame 12a and wear resistant ring 14a at a slight angle toward the tip of the rod blank, though such an angled orientation of the frame 12a and ring 14a are not required. The angled configuration of the frame 12a and ring 14a results in an obtuse angle between the attachment portion 18a and the frame 12a/ring 14a.

Figure 8:
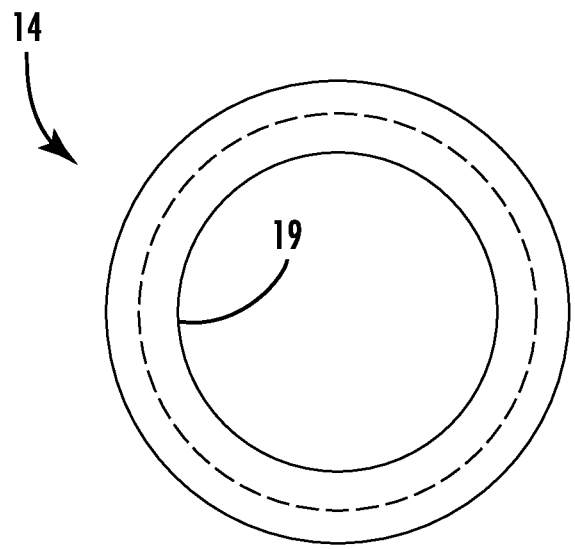
FIG. 8 is a front plan view of the wear resistant ring of FIG. 6.
Figure 8A:
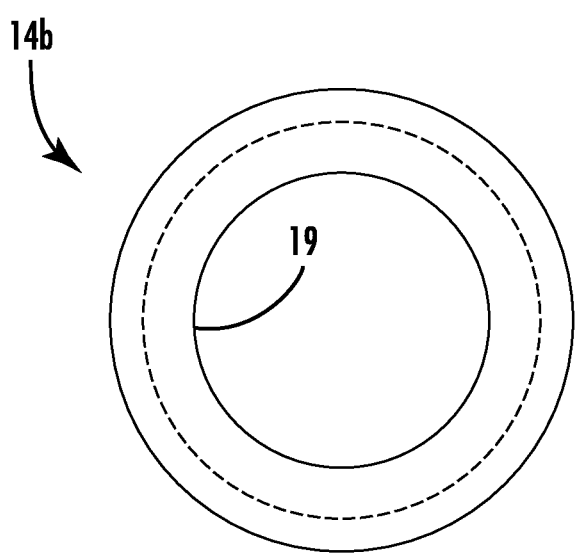
FIG. 8A is a front plan view of the wear resistant ring of FIG. 6A.
Figure 9A:
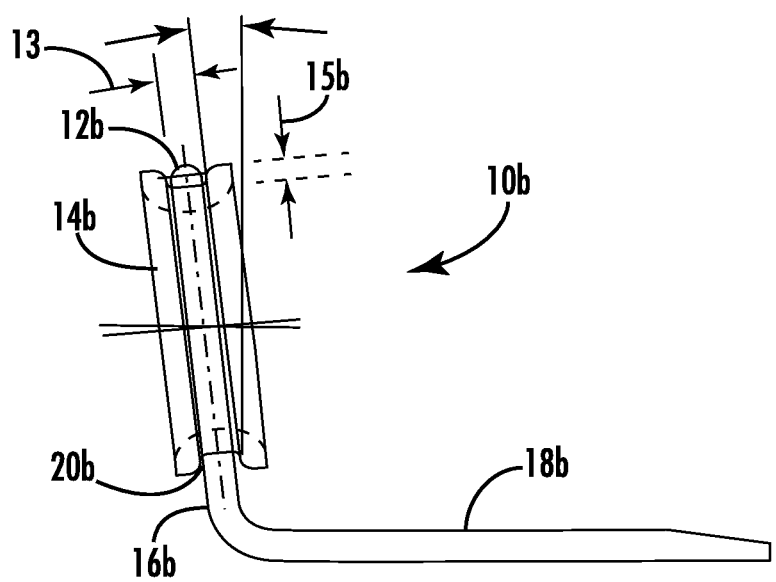
FIG. 9A is a side, sectional view of an alternative embodiment of the line guide assembly of FIG. 9, including an alternative wear resistant ring with a flat bottom groove.
Figure 10:
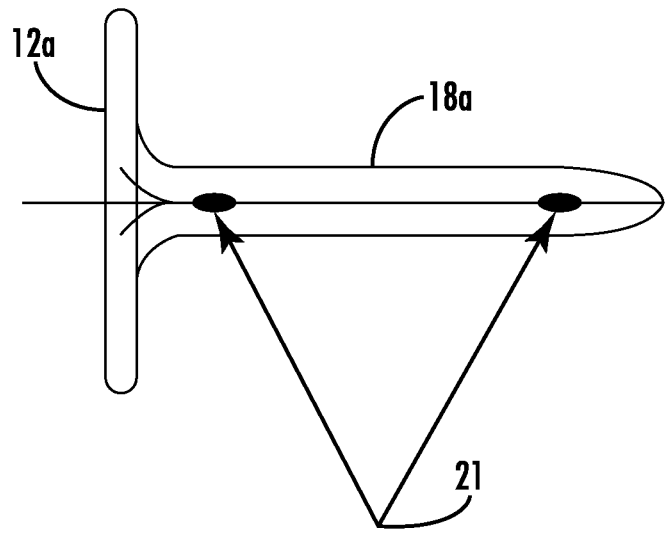
FIG. 10 is a top plan view of the frame, support and attachment of the line guide assembly of FIG. 9.
Figure 11:
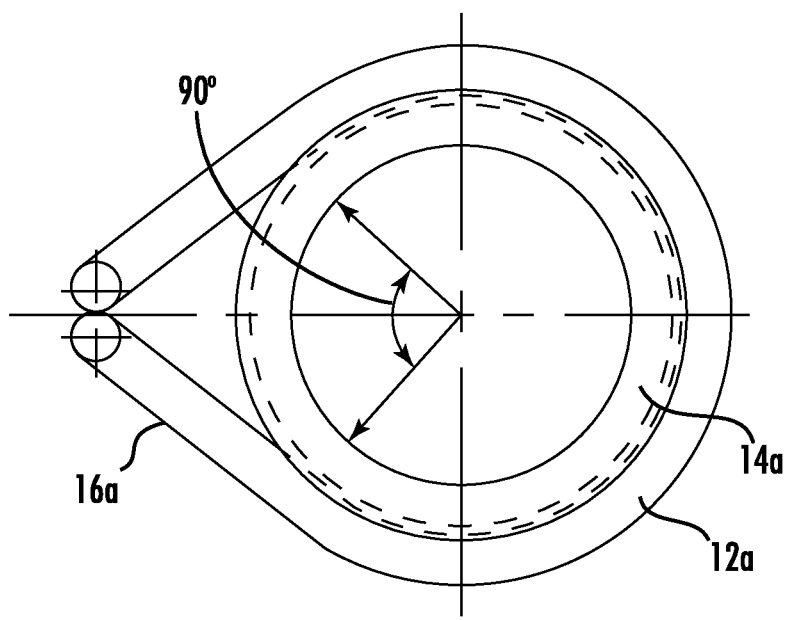
FIG. 11 is an end view of the line guide assembly of FIG. 9.
Figure 12:
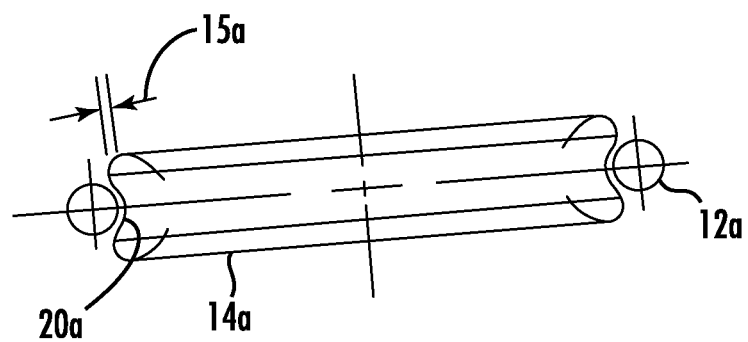
FIG. 12 is a sectional view through the frame and wear resistant ring of the line guide assembly of FIG. 9.

FIG. 9A illustrates a line guide assembly 10b, incorporating a frame 12b, support portion 16b and attachment portion 18b similar in shape and function to that discussed with respect to embodiment 10a. Line guide assembly 10b incorporates a wear resistant ring 14b, as illustrated in FIGS. 6A-8A. The groove 20b of the ring 14b has a depth 15b that is greater than 50% of the diameter 13 of the wire from which the frame 12b is constructed. Thus, a majority of the frame 12b is received within the groove 20b, leaving a rim of frame 12b surrounding the ring 14b.

Figure 13:
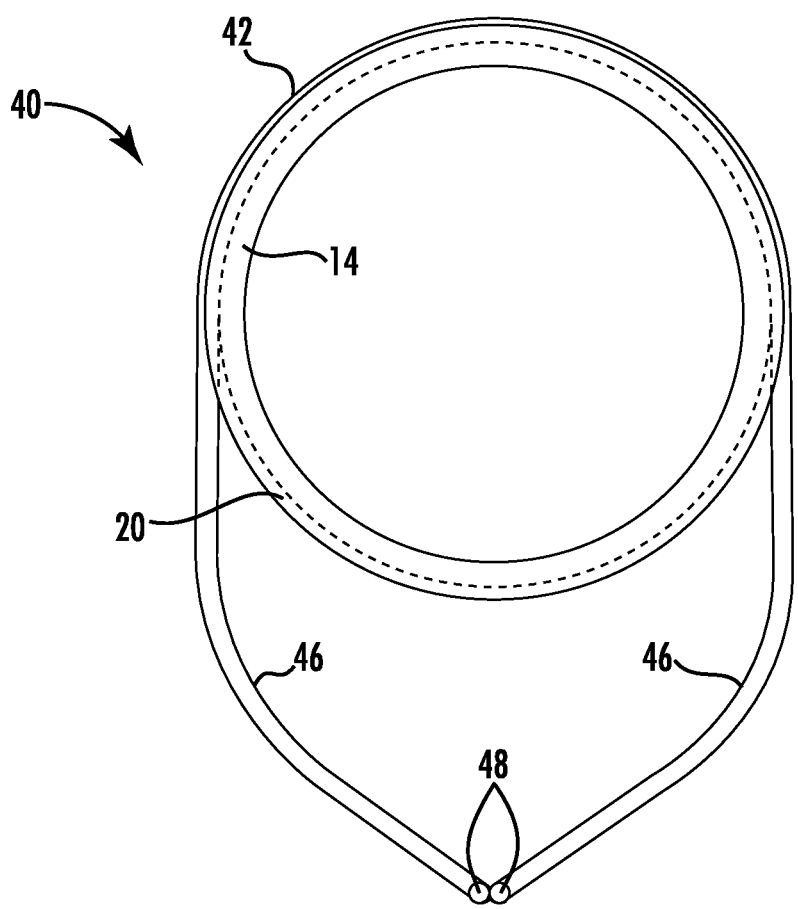
FIG. 13 is a front view of an alternative line guide assembly according to aspects of the disclosure.

A further alternative configuration for a line guide assembly 40 is shown in FIG. 13. This embodiment illustrates a frame 42 configured to surround approximately 50%, or about 180° of the circumference of the wear resistant ring 14. The legs 46 extending from the frame 42 are not straight, and are convexly curved outward relative to the attachment portion 48. This leg configuration may assist in preventing fishing line from becoming tangled around the line guide assembly. The frame 42 is configured to grip the wear resistant ring 14 at the bottom of the groove 20 defined by the ring 14. Adhesive may be used to enhance the mechanical connection between the ring 14 and frame 42. The relationship of the groove depth to the wire diameter is consistent with the description and functionality of the other embodiments.

In all embodiments, the width of the groove 20, 20a, 20b, is selected to accommodate variation in the diameter of the wire from which the frames 12, 12a, 12b, 32, 42 are constructed. It is intended for the frame 12, 12a, 12b, 32, 42 to be received in the groove with little or no resistance between the side walls of the groove 20, 20a, 20b and the frame.

Wear resistant rings compatible with the disclosed line guide assemblies 10, 10a may be constructed of any suitably hard and durable material. Representative examples include metal oxide ceramics, silicon nitride, and carbide materials. Alternatives may include metallic rings that may be coated with wear resistant coatings such as "diamond like" coating or the like. Metallic rings may also be used in their native (uncoated) finish state. FIGS. 6-8 illustrate a representative wear resistant ring with a uniformly concave groove 20 defined by a portion of a circle. Such a configuration maximizes the surface contact between the wire frame 20 and the inside surface of the groove 20, but a tight fit may complicate the use of adhesives.

FIGS. 6A-8A illustrate a representative wear resistant ring 14b with a rectangular or flat bottom groove 20b. The rectangular groove 20b provides a small amount of space between the circular/cylindrical wire frame 12 and the inside surface of the groove 20b. This space facilitates flow of adhesive and promotes wetting of both the wire frame 12 and the inside surface of the wear resistant ring 14b, improving a resultant adhesive bond between the frame and the ring. The relationship of groove depth 15b to wire diameter 13 will be consistent with other embodiments discussed above.

In both embodiments of the wear resistant ring 14a, 14b, the inward facing surface 19 of the ring 14a, 14b is a smooth, convex surface. This surface may be defined by a portion of a circle or a connected series of convex curves projected about the center of the ring 14a, 14b to form an annular structure. The surface 19 is free of corners or sharp curves and is configured to allow the fishing line to slide over the surface with low resistance and without damage to the fishing line. The surface 19 may be polished or in the case of a metal wear resistant ring, may be coated by physical vapor deposition "PVD" with a hard coating such as diamond like carbon "DLC" or Aluminum Titanium Carbo Nitride (AlTiCN) to resist wear.

Figure 15:
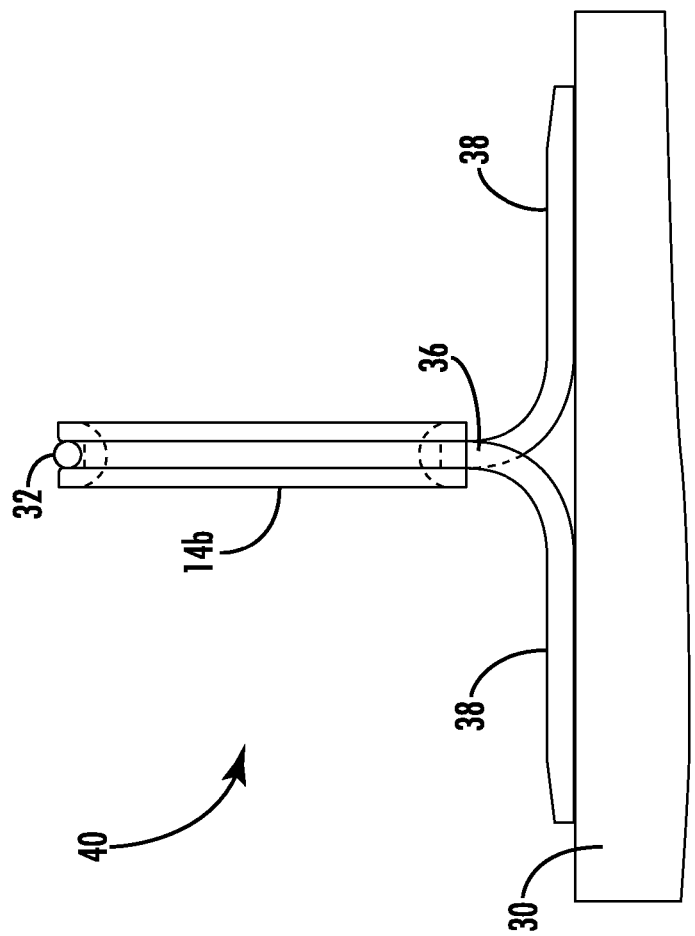
FIG. 15 is a side view of the two footed line guide assembly of FIG. 14.
Figure 14:
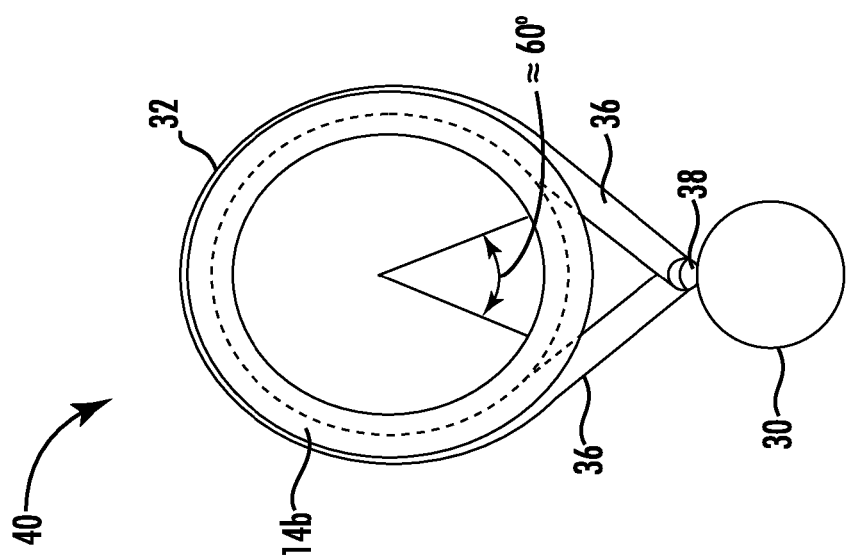
FIG. 14 is a front view of an alternative two footed line guide assembly according to aspects of the disclosure.
Figure 17:
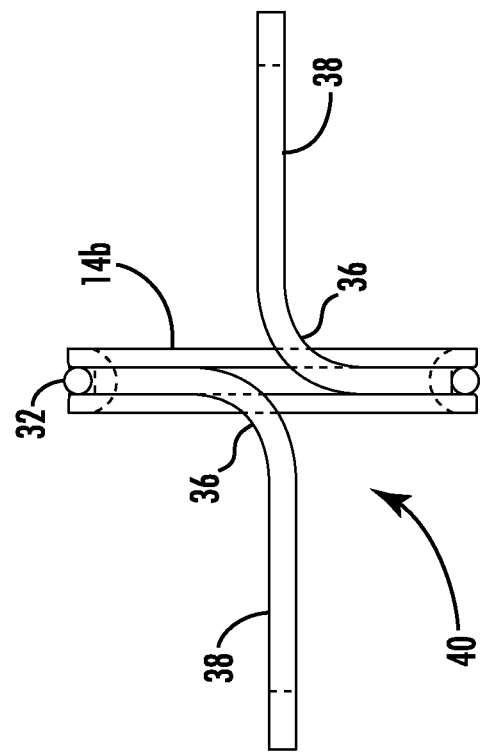
FIG. 17 is a bottom view of the two footed line guide assembly of FIG. 14.
Figure 16:
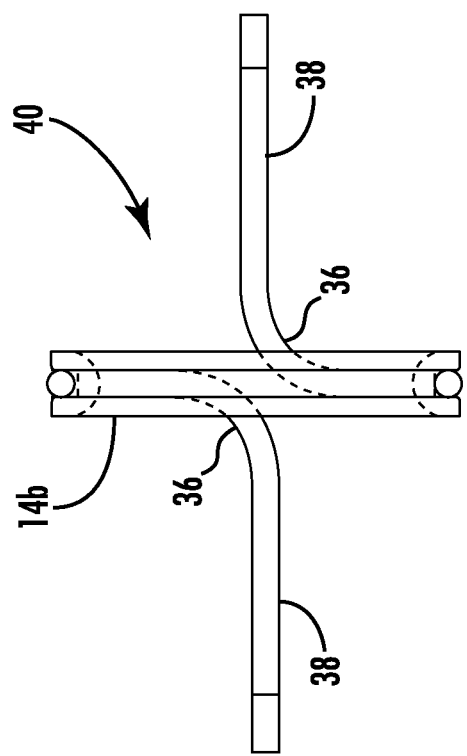
FIG. 16 is a top view of the two footed line guide assembly of FIG. 14.

The illustrated line guide assemblies 10, 10a are of the single foot configuration, but the disclosed materials and methods are compatible with a two foot guide configuration as shown in FIGS. 14-17. In the two foot configuration, the legs 36 extending from the frame 32 each terminate in a foot 38 oriented in opposite directions along the rod blank 30. The frame 32 is configured to surround a majority of the circumference of the wear resistant ring 14, with the illustrated embodiment surrounding at least 83% of the circumference of the ring, or about 300°, leaving about 60° of the ring 14 not surrounded by the frame 32. The relationship between the frame 32 and the ring 14 in the embodiment of FIGS. 14 and 15 is consistent with that of the other embodiments 12, 12a discussed above.

What is claimed:

1. A line guide assembly comprising:
a ceramic ring having a groove defined on an outside circumference of said ceramic ring and centered on a plane extending through said ceramic ring;
a frame surrounding less than 360° of the outside circumference of the ceramic ring and at least partially received in said groove in direct contact with ceramic material of said ceramic ring along an entirety of where the frame surrounds the ceramic ring, said frame being part of a wireform including support and attachment portions configured to position said ceramic ring a pre-determined distance and angular orientation relative to said attachment portion;
wherein said wireform is constructed from a single, continuous length of shape memory metal alloy material, in unattached configuration, said frame has an inside diameter in said plane and said ceramic ring has an outside diameter at a bottom of said groove in said plane, said inside diameter being smaller than said outside diameter, resulting in an interference fit between said frame and said ceramic ring, with the frame elastically gripping said ceramic ring in an attached configuration.

2. The line guide assembly of claim 1, wherein said frame surrounds at least 180° of the outside circumference of said ceramic ring.

3. The line guide assembly of claim 1, wherein said wireform is constructed of wire having a diameter and said groove has a depth equal to at least 25% of said diameter.

4. The line guide assembly of claim 1, wherein said wireform is constructed of wire having a diameter and said groove has a depth equal to at least 50% of said diameter.

5. The line guide assembly of claim 1, wherein said wireform is constructed of nickel titanium (NiTi) wire having a uniform circular cross section.

6. The line guide assembly of claim 1, wherein said wireform extends between opposite ends, and said attachment portions comprise the ends of the wireform, said ends extending from said support portions.

7. The line guide assembly of claim 1, wherein said attachment portions comprise ends of the wireform, wherein said ends extend from said support portions and project in opposite directions to form two feet.

8. The line guide assembly of claim 1, wherein a portion of said frame projects radially outward of said groove and protects said ceramic ring from impact.

9. The line guide assembly of claim 1, wherein said wireform is constructed of wire having a diameter, said groove has a depth equal to at least 25% of said diameter, and said frame surrounds at least 50% of the outside circumference of said ceramic ring.

10. The line guide assembly of claim 1, comprising adhesive between said frame and said groove.

11. The line guide assembly of claim 1, wherein said ceramic ring is constructed of a ceramic material selected from the group consisting of metal oxide ceramics, silicon nitride, and carbide.

12. The line guide assembly of claim 1, wherein said frame and ceramic ring are supported at an obtuse angle relative to said attachment portions.

13. The line guide assembly of claim 1, wherein said groove includes a flat bottom.

14. A line guide assembly comprising:
a ceramic ring having a groove defined on an outside circumference;
a frame surrounding less than 360° of the outside circumference of the ceramic ring and at least partially received in said groove, in direct contact with ceramic material of said ceramic ring along an entirety of where the frame surrounds the ceramic ring, said frame being part of a wireform including support and attachment portions configured to position said ceramic ring a pre-determined distance and angular orientation relative to said attachment portion;
wherein said wireform is constructed from a single, continuous length of nickel titanium (NiTi) shape memory alloy wire, wherein said NiTi wireform is in an austenitic state at temperatures above a transformation temperature and a martensitic state at temperatures below said transformation temperature, said NiTi wireform having a shape elastically engaged with the groove of said ceramic ring when in the austenitic state, said NiTi wireform being pliable in said martensitic state, wherein said NiTi wireform can be distorted in its martensitic state to permit replacement of said ceramic ring, and upon warming the NiTi wireform to a temperature above said transformation temperature, said NiTi wireform assumes the shape elastically engaged with the groove of said ceramic ring.

15. The line guide assembly of claim 14, wherein said wireform includes first and second ends, said attachment portions comprise the first and second ends of the wireform, said first and second ends extending from said support portions and secured to each other to form a single foot, said NiTi wireform can be distorted in its martensitic state to permit replacement of said ceramic ring while said support portions remain secured to each other.

16. A line guide assembly comprising:
a ceramic ring having an outside circumference and a groove defined on said outside circumference, said groove bi-sected by a plane passing through said ring, said ring having an outside diameter aligned with said plane at a bottom of said groove;
a frame surrounding less than 360° of outside circumference of said ceramic ring and at least partially received in said groove in direct contact with ceramic material of said ceramic ring along an entirety of where the frame surrounds the ceramic ring, said frame having an inside diameter aligned with said plane, said frame being part of a wireform including support and attachment portions configured to position said ceramic ring a predetermined distance and angular orientation relative to said attachment portions;
wherein said wireform consists of a single, continuous length of shape memory metal alloy material, and in an unattached configuration said inside diameter being smaller than said outside diameter at said plane, resulting in an interference fit between said frame and said ceramic ring with the frame elastically gripping said ceramic ring in an attached configuration.

17. The line guide assembly of claim 16, wherein said frame surrounds at least 180° of said outside circumference.

* * * * *